(12) United States Patent
Liu et al.

(10) Patent No.: US 8,385,257 B2
(45) Date of Patent: Feb. 26, 2013

(54) METHOD FOR RELAYING AND FORWARDING THE FEEDBACK INFORMATION IN HARQ SCENARIO

(75) Inventors: Yang Liu, Shenzhen (CN); Yu Xin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 397 days.

(21) Appl. No.: 12/812,364

(22) PCT Filed: Mar. 17, 2008

(86) PCT No.: PCT/CN2008/000522
§ 371 (c)(1),
(2), (4) Date: Aug. 30, 2010

(87) PCT Pub. No.: WO2009/089664
PCT Pub. Date: Jul. 23, 2009

(65) Prior Publication Data
US 2011/0007684 A1    Jan. 13, 2011

(30) Foreign Application Priority Data

Jan. 11, 2008  (CN) .......................... 2008 1 0000454

(51) Int. Cl.
H04B 7/212   (2006.01)

(52) U.S. Cl. ........ 370/324; 370/350; 370/503; 375/357; 375/358

(58) Field of Classification Search .......................... None
See application file for complete search history.

(56) References Cited

U.S. PATENT DOCUMENTS

| | | | |
|---|---|---|---|
| 7,116,651 B2 | 10/2006 | Hakkinen et al. | |
| 2007/0183451 A1 | 8/2007 | Lohr et al. | |
| 2009/0217119 A1 * | 8/2009 | Zhang et al. | 714/748 |
| 2010/0097979 A1 * | 4/2010 | Shinozaki | 370/315 |
| 2010/0246478 A1 * | 9/2010 | Liu et al. | 370/315 |

FOREIGN PATENT DOCUMENTS

| | | |
|---|---|---|
| JP | 2007-60589 A | 3/2007 |
| JP | 2009-524323 A | 6/2009 |
| JP | 2010-504665 A | 2/2010 |
| WO | 2006047851 A1 | 5/2006 |
| WO | 2007083219 A2 | 7/2007 |

OTHER PUBLICATIONS

Liu, Y., et al., "Downlink Hop by Hop HARQ for Multihop Non-transparent RS with Distributed Scheduling", http://grouper.ieee.org/groups/802/16/relay/contrib/C80216j-07_408r2.doc, Jul. 13, 2007, pp. 1-5, Publisher: IEEE 802 LAN/MAN Standards Committee: IEEE 802.16 Broadband Wireless Access Working Group.

Taori, R., et al., "Corrections to HARQ ACK/NAK scheduling", http://grouper.ieee.org/groups/802/16/relay/contrib/C80216j-07_524.doc, Sep. 9, 2007, pp. 1-6, Publisher: IEEE 802 LAN/MAN Standards Committee: IEEE 802.16 Broadband Wireless Access Working Group.

* cited by examiner

*Primary Examiner* — Jianye Wu
(74) *Attorney, Agent, or Firm* — Hultquist, PLLC; Steven J. Hultquist; Kelly K. Reynolds

(57) ABSTRACT

A method for relaying and forwarding feedback information in hybrid automatic repeat request scenario is provided, wherein the method for sending feedback information includes that: a relay station receives a resource allocation message; the relay station determines the time of sending the feedback information according to the resource allocation message, and sends the corresponding feedback information when the feedback time arrives. The processes of triggering the relay station to perform feedback or sending in multiple HARQ scenarios such as initial transmission and retransmission of downlink and uplink, and uplink feedback loss of subordinate node etc. are integrally and uniformly defined according to the present invention.

10 Claims, 8 Drawing Sheets

METHOD FOR RELAYING AND FORWARDING THE FEEDBACK INFORMATION IN HARQ SCENARIO

CROSS-REFERENCE TO RELATED APPLICATIONS

This application is a U.S. national phase application under the provisions of 35 U.S.C. §371 of International Application No. PCT/CN08/00522 filed Mar. 17, 2008, which in turn claims priority of Chinese Patent Application No. 200810000454.3 filed Jan. 11, 2008. The disclosures of such international application and Chinese priority application are hereby incorporated herein by reference in their respective entireties, for all purposes.

TECHNICAL FIELD

The present invention relates to communication field, and more specifically relates to a method for relaying and forwarding the feedback information in HARQ (Hybrid Automatic Repeat Request) scenario.

BACKGROUND OF THE INVENTION

To enlarge the coverage area of the system and increase the system capacity, one or more relay stations (RS for short) have been set up between a multi-hop relay base station (MR-BS for short) and a mobile station (MS for short). As shown in FIG. 1, an RS is able to enlarge the coverage area of the system or increase the system capacity by relaying transmissions between an MR-BS and an MS.

At present, resource scheduling of a relaying system can be divided into centralized control and distributed control, wherein the allocation of channel resources in the centralized system must be carried out by the MR-BS, while the RS in the distributed system may allocate part of the resources by itself. Since all resource scheduling in the relaying system using the centralized control are processed by the MR-BS, the corresponding design of hybrid automatic repeat request (HARQ) is more complex.

In the existing technologies, regarding centralized relay of end-to-end HARQ, the superordinate control station has already allocated corresponding feedback channel forwarding acknowledgement (ACK)/negative acknowledgement (NAK) to each RS before the RS sends certain HARQ data. Once an RS receives the data to be forwarded, it is triggered to begin to calculate in which frame the feedback shall start, and then it sends the feedback on the corresponding resources. In the case of transmitting HARQ by downlink data, the feedback sent after an RS delay serves to identify the receiving situation of downlink data in the relay link; in the case of transmitting HARQ by uplink data, the feedback sent after an RS delay is used to identify the receiving situation of uplink data in the relay link.

However, in the existing technologies, there is no uniform feedback method for triggering an RS of the centralized control type to calculate feedback delay in different HARQ application scenarios. For example, in the system shown in FIG. 1, data retransmission may begin at the subordinate node RS2 of RS1. In the case of downlink data retransmission, neither RS1 nor RS2 can receive data to be forwarded, and therefore they will not be triggered to begin to calculate the time delay of forwarding corresponding downlink data feedback. In case of uplink data retransmission, RS1 can not receive data to be forwarded, and therefore it will not be triggered to begin to calculate the time delay of forwarding corresponding uplink feedback. In the existing technologies, the methods of triggering an RS to calculate feedback time delay by downlink data retransmission and by initial data retransmission are different. Moreover, it is not specified how an RS shall process if the uplink feedback fails to be received. Additionally, nor is it specified in the existing technologies how to trigger an RS used for retransmitting data to begin to calculate time delay in the retransmission of uplink data.

SUMMARY OF THE INVENTION

To solve one or more problems listed above, the present invention provides a method for relaying and forwarding feedback information in hybrid automatic repeat request (HARQ) scenario.

According to the embodiments of the present invention, the method for relaying and forwarding feedback information in hybrid automatic repeat request (HARQ) scenario comprises: a relay station receives a resource allocation message; the relay station determines the time of sending the feedback information according to the resource allocation message and sends the corresponding feedback information when the feedback time arrives.

Wherein, the hybrid automatic repeat request scenarios may be divided into two scenarios, i.e. one scenario of sending downlink data by the relay station and the other scenario of sending uplink data by the relay station.

In scenario 1, during sending downlink data to a subordinate node, the relay station receives a resource allocation message from a superordinate node indicating the relay station to receive feedback information of the subordinate node in the $i^{th}$ frame; if having received the feedback information in the $i^{th}$ frame, the relay station sends upwardly the feedback information to a multi-hop relay base station in the $(i+j)^{th}$ frame through the uplink feedback channel allocated by the multi-hop relay base station, or else the relay station sends upwardly the information for notifying the multi-hop relay base station of the hop at which retransmission occurs in the $(i+j)^{th}$ frame through the uplink feedback channel, wherein j is the time delay caused by dealing with the feedback information by the relay station.

Wherein, if the feedback information is acknowledgement information, the relay station directly sends upwardly the feedback information to the multi-hop relay base station. If the feedback information is negative acknowledgement information, the relay station processes the feedback information and sends upwardly the processed feedback information to the multi-hop relay base station so as to notify the multi-hop relay base station of the hop at which retransmission occurs.

Wherein, if the relay station fails to receive the feedback information in the $i^{th}$ frame since the relay station has not received the downlink data successfully, the relay station notifies the multi-hop relay base station that retransmission occurs between the relay station and the superordinate node thereof. If the relay station has received the downlink data successfully, but failed to receive the feedback information in the $i^{th}$ frame due to bad wireless channel, the relay station notifies the multi-hop relay base station that retransmission occurs between the relay station and the subordinate node thereof.

In scenario 2, during sending uplink data to the superordinate node, the relay station receives a resource allocation message from the superordinate node indicating the relay station to send the uplink data in the $i^{th}$ frame; if having received the uplink data correctly, the relay station sends upwardly to the superordinate node in the $i^{th}$ frame the information for notifying the superordinate node that the relay station has successfully received the uplink data and the uplink data respectively through the uplink feedback channel and the transmission channel allocated by the multi-hop relay base station, otherwise the relay station sends upwardly the information for notifying the multi-hop relay base station of the hop at which retransmission occurs through the uplink feedback channel in the $i^{th}$ frame.

In the present invention, the actions of feedback and sending performed by the relay station do not relate to whether HARQ data is received or feedback is conducted, and therefore, it is achieved a complete and uniform definition of processes triggering the relay station to perform feedback or sending in several HARQ scenarios such as initial transmission and retransmission of downlink and uplink, and uplink feedback loss of subordinate node.

BRIEF DESCRIPTION OF THE DRAWINGS

The figures illustrated here provide a further understanding to the present invention and constitute a part of the present application. The schematic embodiments and explanations thereof serve to explain the present invention and are not intended to restrict it. In the figures.

DETAILED DESCRIPTION OF THE PREFERRED EMBODIMENTS

The embodiments of the present invention will be illustrated in combination with the accompanying drawings in details as follows.

Figure 1:
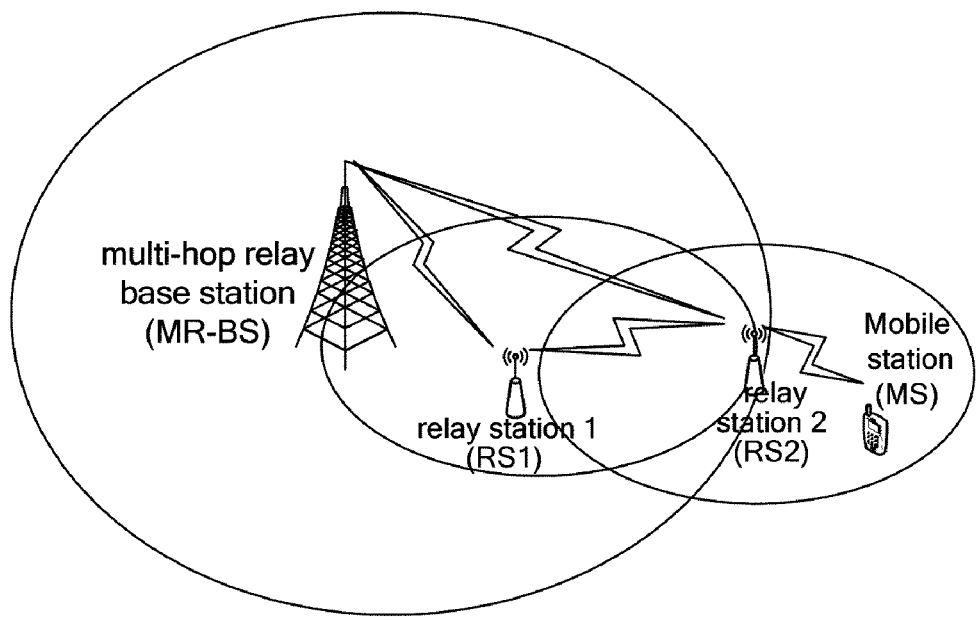
FIG. 1 is a schematic diagram showing wireless relay network configuration according to an embodiment of the present invention.

The network topological configuration of wireless relay network according to an embodiment of the present invention is shown in FIG. 1. A communication link is formed between an MR-BS and an MS by the relay of RS1 and RS 2.

Figure 2:
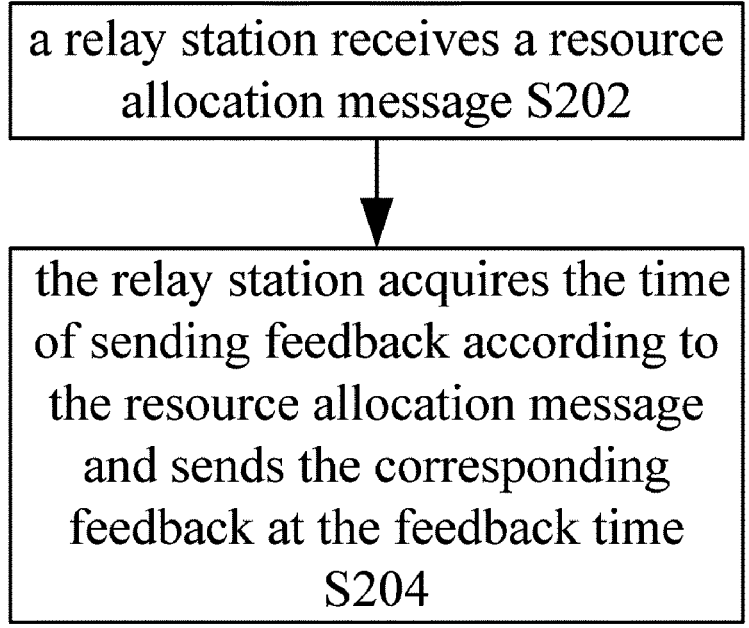
FIG. 2 is a flow chart showing the method for relaying and forwarding feedback information by the relay station according to an embodiment of the present invention.

The method for relaying and forwarding feedback information by the relay station according to the present invention will be illustrated in combination with FIG. 2. As shown in FIG. 2, the method comprises the following steps: S202, the relay station receives a resource allocation message; S204, the relay station determines the time of sending feedback information according to the resource allocation message and sends the corresponding feedback information when the feedback time arrives.

Wherein, in step 204, in case of a downlink data HARQ scenario, if MR-BS requires the RS to receive the feedback performed by the subordinate node to a certain HARQ data in the $i^{th}$ frame, it must allocate resources to the RS via a resource allocation message. The RS acquires that a certain feedback needs to be received in the $i^{th}$ frame by decoding this resource allocation message, and accordingly RS may calculate by itself that the MR-BS is to allocate uplink feedback channel to it for this feedback in the $(i+j)^{th}$ frame, and the RS shall send upwardly the corresponding processed data feedback in the $(i+j)^{th}$ frame. The time delay j of processing feedback may be presented via a system broadcasting message.

Correspondingly, if the RS has not received the feedback performed by the subordinate node to a certain HARQ data in the $i^{th}$ frame, since RS may acquire from the resource allocation message that the feedback shall be received at this moment, the RS may begin to calculate time from the $i^{th}$ frame, and send upwardly the code feedback produced by itself via the uplink feedback channel allocated by the MR-BS in the $(i+j)^{th}$ frame to notify the MR-BS of the hop at which retransmission shall begin.

Wherein, in step 204, in case of an uplink data HARQ scenario, if the MR-BS requires the RS to send the feedback of certain uplink HARQ data in the $i^{th}$ frame, it must allocate resources for sending the corresponding HARQ data to the RS via a resource allocation message. In the end to end HARQ, the MR-BS always assumes that the RS has correctly received uplink data. Therefore, no matter whether the RS has successfully received uplink data or not, it is necessary to allocate a resource allocation message for sending uplink data. The RS acquires that certain HARQ data needs to be sent in the $i^{th}$ frame by decoding this resource allocation message. Accordingly the RS may calculate by itself that the MR-BS is to allocate uplink feedback channel to it for this feedback in the $i^{th}$ frame, and RS shall send upwardly the corresponding processed data feedback in the $i^{th}$ frame.

Wherein, after completing step 204, the relay station may further forward the feedback and the corresponding data in allocation resources according to the result of the time delay. Wherein, the said resource allocation message above comprises uplink resource allocation message and downlink resource allocation message.

Figure 3:
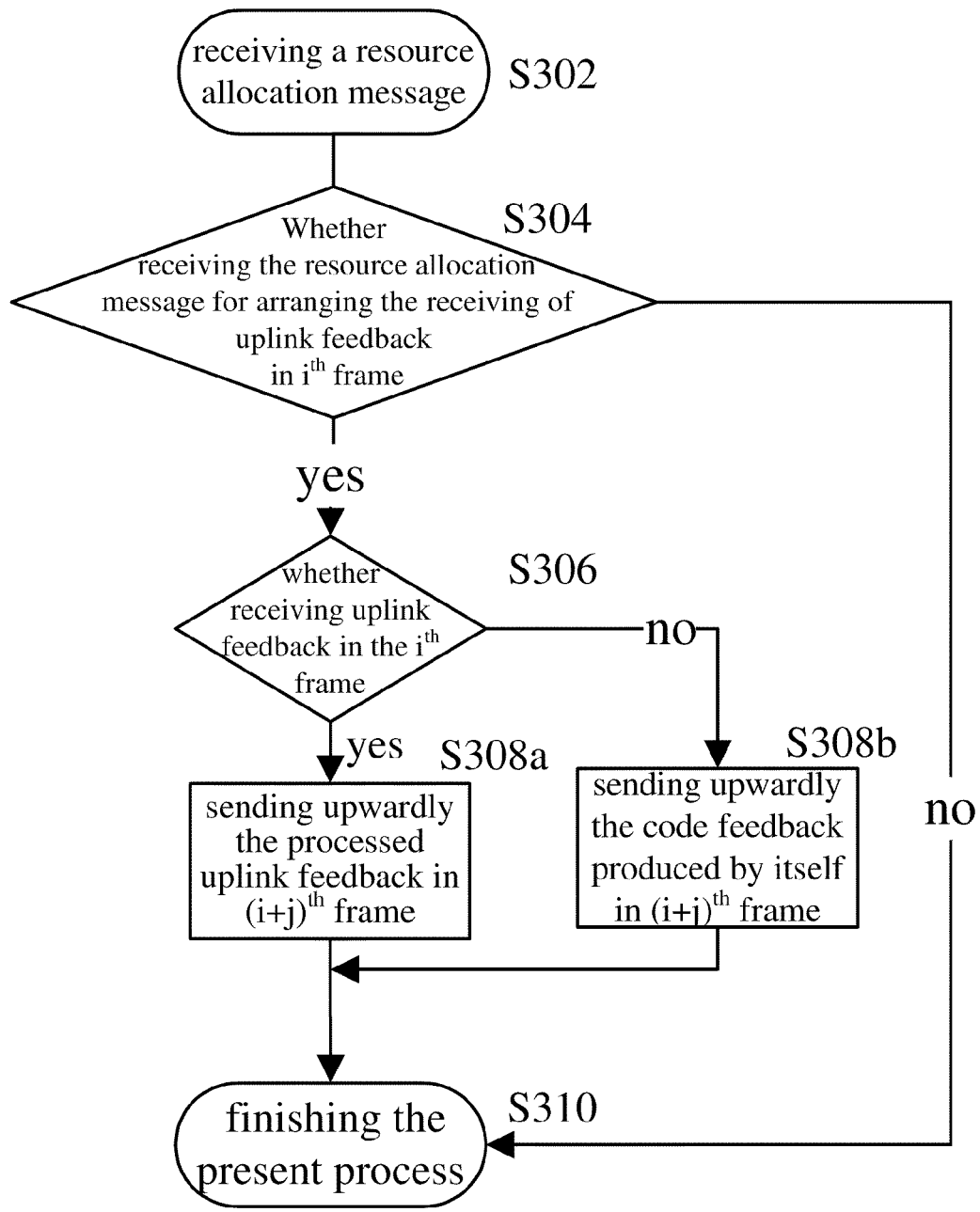
FIG. 3 is a detailed flow chart showing the method for forwarding feedback information in the scenario of transmitting HARQ by downlink data according to an embodiment of the present invention.

The method for forwarding feedback information in the scenario of transmitting HARQ by downlink data according to the embodiments of the present invention is illustrated in combination with FIG. 3. As shown in FIG. 3, the method comprises the following steps:

S302, a resource allocation message sent by the superordinate node is received.

S304, if the resource allocation message serves to arrange the relay station to receive uplink feedback in the $i^{th}$ frame, then turn to S306, or else turn to S310.

S306, if the RS has received the uplink feedback in the $i^{th}$ frame, then turn to S308a, or else turn to S308b.

S308a, the RS sends upwardly the corresponding feedback via uplink feedback channel allocated by MR-BS in the $(i+j)^{th}$ frame. Direct forwarding is conducted in case of receiving acknowledgement (ACK). In case of receiving a code indicating the need of retransmission, sending upwardly is conducted after processing to notify the MR-BS of the hop at which retransmission occurs.

S308b, the RS sends upwardly the incorrect code produced by itself via the uplink feedback channel allocated by the MR-BS in the $(i+j)^{th}$ frame to notify the MR-BS of the hop at which retransmission occurs.

S310, processing of the present HARQ is finished. It is assumed here that one process is for one HARQ data and one feedback.

More concretely, no feedback from subordinate node in uplink occurs in two situations: in the first situation, the RS itself has failed to receive downlink data, and therefore does not have to send the incorrect data downwardly. As the subordinate node does not receive the downlink data, it will not perform feedback. In the second situation, the RS itself has successfully received downlink data and further forwarded the downlink data, but failed to receive the feedback from the subordinate node due to bad wireless channel.

Correspondingly, retransmission of code also occurs in two situations: in the first situation, the RS knows the failure of receiving data by itself, and therefore the code shall indicate that retransmission occurs between the superordinate node and the present node. In the second situation, the RS knows the success of receiving data by itself, and therefore the code shall indicate that retransmission occurs between the present node and the subordinate node.

Figure 4:
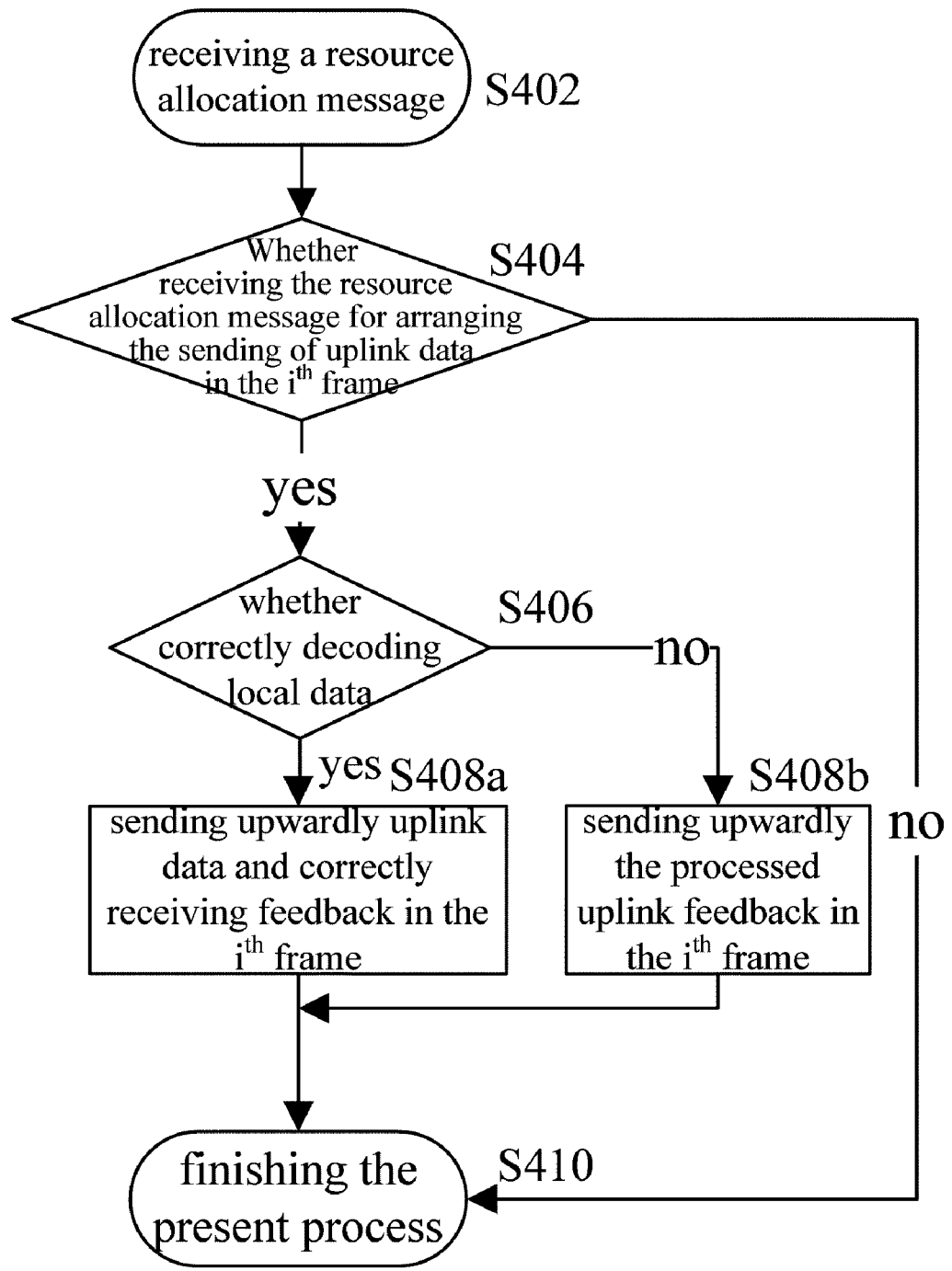
FIG. 4 is a detailed flow chart showing the method for forwarding uplink data in the scenario of transmitting HARQ by uplink data according to an embodiment of the present invention.

The method for forwarding uplink data in the scenario of transmitting HAQR by uplink data according the embodiments of the present invention is illustrated in combination with FIG. 4. As shown in FIG. 4, the method comprises the following steps:

S402, a resource allocation message sent by the superordinate node is received.

S404, if the resource allocation message serves to arrange the relay station to send uplink data in the $i^{th}$ frame, then turn to S406, or else turn to S410.

S406, if local HARQ data is decoded correctly, then turn to S408a, or else turn to S408b.

S408a, the RS feedbacks ACK in the $i^{th}$ frame via uplink feedback channel allocated by MR-BS and sends upwardly the corresponding data feedback on the transmission channel.

S408b, the RS feedbacks incorrect code in the $i^{th}$ frame via the uplink feedback channel allocated by the MR-BS and does not transmit data on the transmission channel, wherein the incorrect code serves to notify the MR-BS of the hop at which retransmission occurs.

S410, processing of the present HARQ is finished.

The implementation of the above method in IEEE802.16j system shall be illustrated in details as follows.

In the embodiments of the present invention, HARQ data may be HARQ sub-burst defined in the IEEE802.16j documents. In addition, time delays of all transmission processing are assumed to be 1 frame (j=1).

In respect of downlink data HARQ, once the RS receives uplink map (MAP) message for allocating resources (indicating the RS to receive the feedback of subordinate node to certain HARQ sub-burst in the $i^{th}$ frame), the RS shall read HARQ acknowledgement channel region allocation information for relaying data information entity (HARQ_ACKCH region allocation for Relay Data IE) from that message and acquires whether it needs to receive the feedback at that frame or not. In IEEE802.16j system, resource allocation message and feedback may be received in the same frame.

For example, the RS shall receive MAP message in the $i^{th}$ frame, read from the corresponding information entity (IE) the channel where the feedback is received, receive that feedback in the arranged channel in the $i^{th}$ frame, and sends upwardly the corresponding processed feedback in uplink feedback channel allocated by BS in $(i+1)^{th}$ frame.

Figure 5:
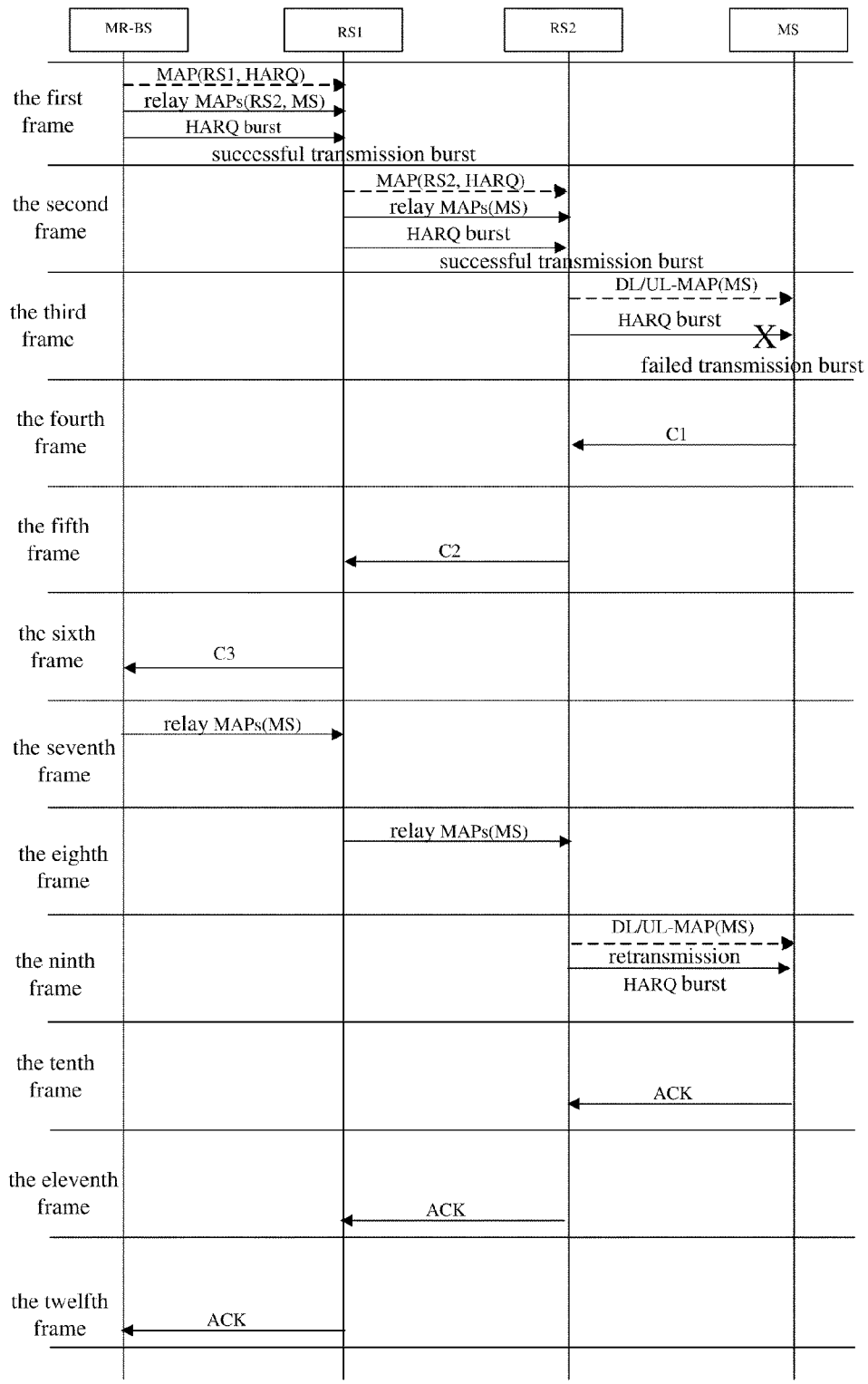
FIG. 5 is a schematic diagram showing the flow of retransmission feedback of downlink end-to-end HARQ access link in IEEE802.16j system according to an embodiment of the present invention.

In FIG. 5 showing an example of burst retransmission by access link, RS2 receives an MAP message indicating the RS2 to receive code C1 (NAK) from the MS in the fourth frame, acquires a code C2 by increasing the sequence number of the code C1 by one and further sends upwardly the code C2 in the fifth frame. RS1 receives an MAP message in the fifth frame indicating the RS1 to receive the code C2 from RS2 in the fifth frame, and correspondingly RS1 acquires a code C3 by increasing the sequence number of the code C2 by one and further sends upwardly the code C3 in the sixth frame. After receiving the final code C3, the MR-BS knows that retransmission is arranged at the third hop. In HARQ data retransmission beginning at the ninth frame, RS2 receives an MAP message in the tenth frame indicating it to receive ACK from MS in the tenth frame, and therefore RS2 shall further send upwardly ACK without any change in the eleventh frame by calculation.

Figure 6:
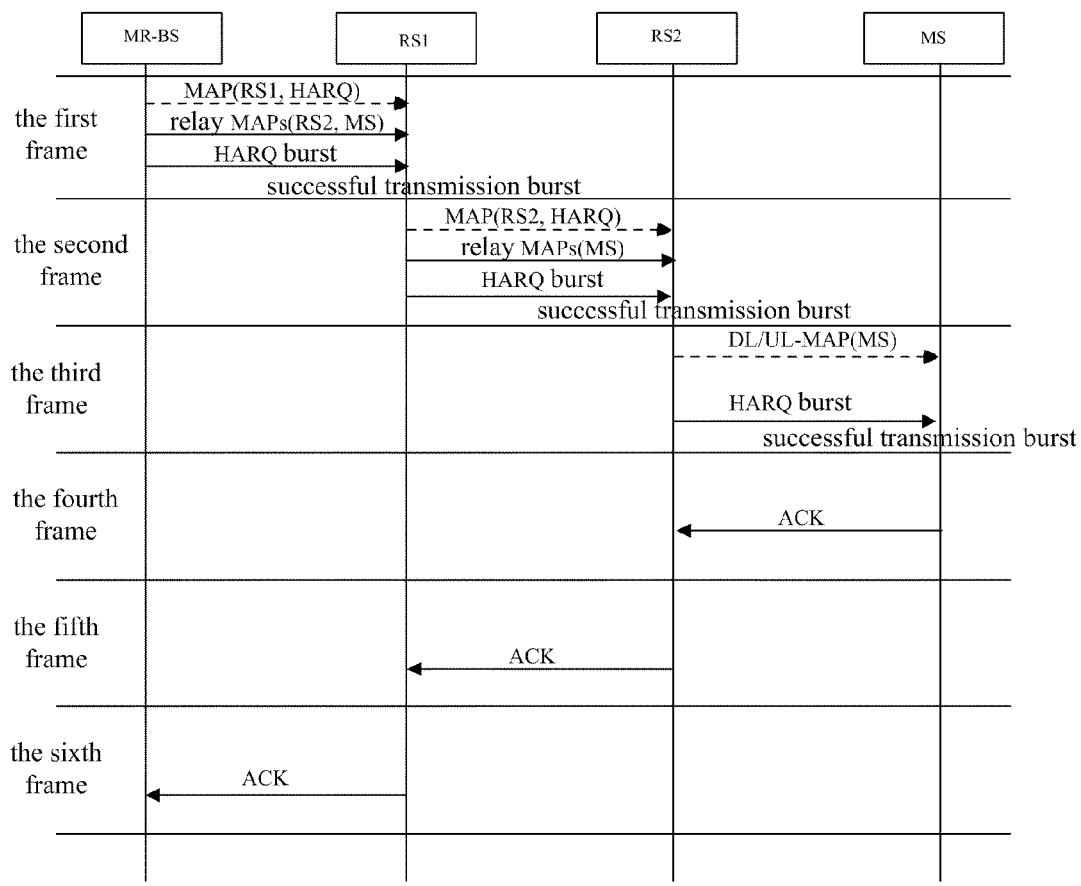
FIG. 6 is a schematic diagram showing the flow of initial transmission of downlink end-to-end HARQ in IEEE802.16j system according to an embodiment of the present invention.

Correspondingly, FIG. 6 shows an example of successful burst transmission. RS2 receives an MAP message in the fourth frame indicating it to receive the feedback from MS in the fourth frame, and therefore RS2 shall send upwardly the received ACK without any change in the fifth frame. RS1 receives an MAP message in the fifth frame indicating it to receive the relayed feedback from RS2 in the fifth frame, and therefore RS1 shall send upwardly this ACK without any change in the sixth frame. When receiving the final ACK, MR-BS shall arrange transmission of the next HARQ data.

Figure 7:
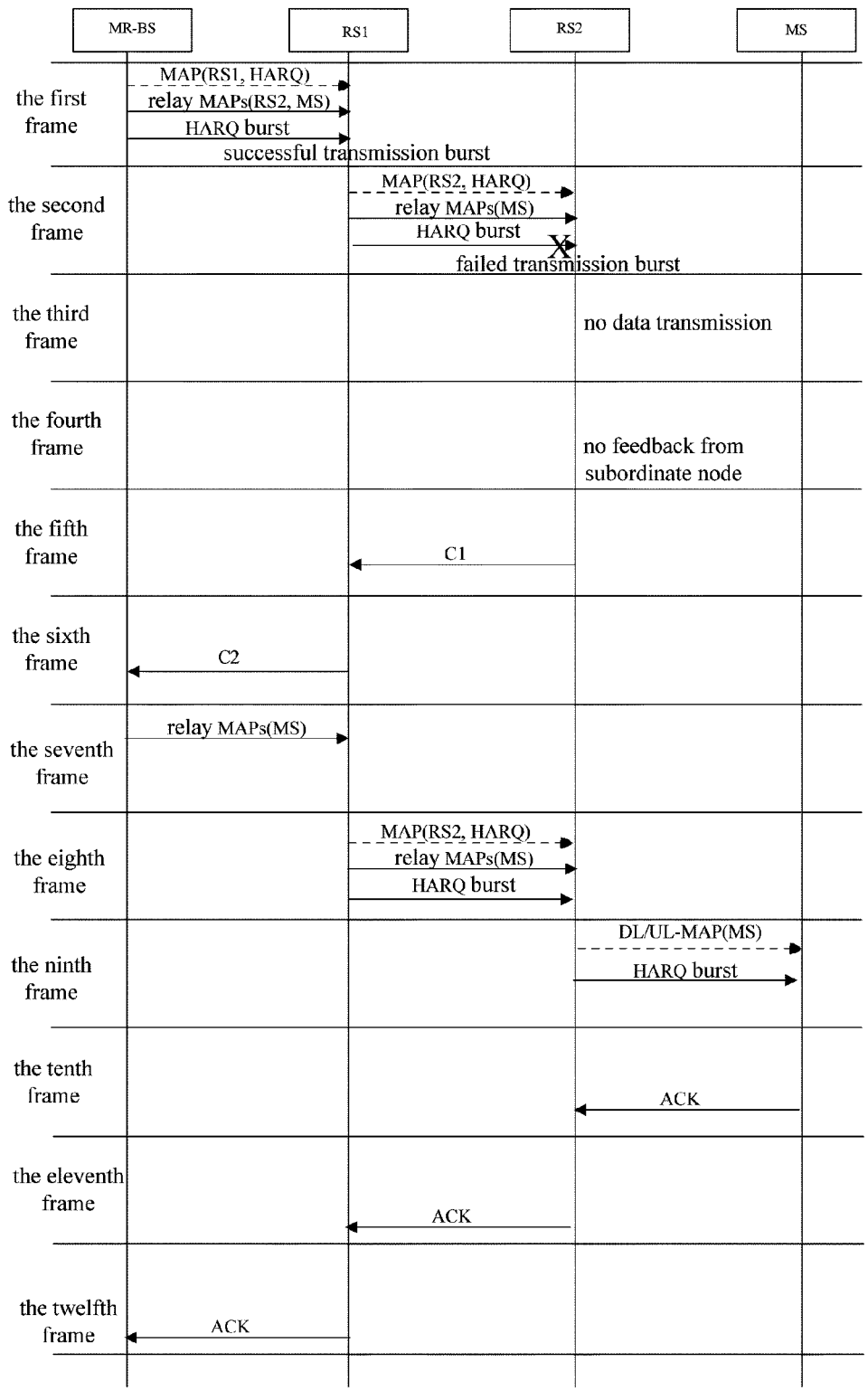
FIG. 7 is a schematic diagram showing the flow of situation 1 of uplink feedback loss of downlink end-to-end HARQ subordinate node in IEEE802.16j system according to the embodiments of the present invention.
Figure 8:
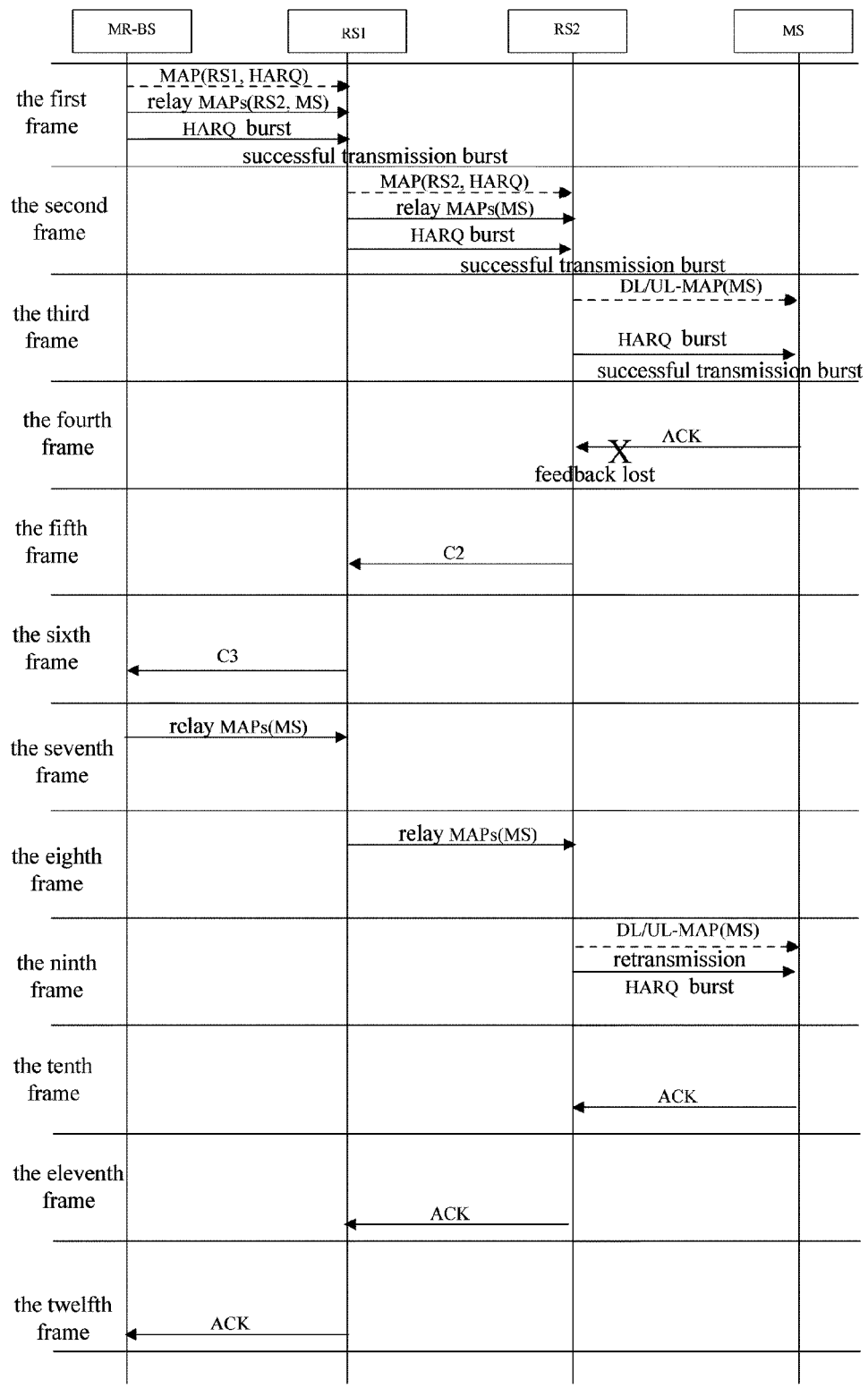
FIG. 8 is a schematic diagram showing the flow of situation 2 of uplink feedback loss of downlink end-to-end HARQ subordinate node in IEEE802.16j system according to the embodiments of the present invention.

FIGS. 7 and 8 respectively show the two embodiments of no feedback situation. In the two embodiments, RS may acquire the frame in which it shall receive uplink feedback via an uplink MAP message. In FIG. 7, as RS2 itself has failed to receive downlink data, it is possible for it not to downwards send the incorrect data. MS may not receive the data and shall not give a feedback. RS2 receives an MAP message indicating RS2 to receive the feedback in the fourth frame. However, in the fourth frame, RS2 may not receive the feedback and has acquired its failure to receive downlink data, and therefore it shall send upwardly feedback code C1 in the fifth frame and retransmission begins from RS1. In FIG. 8, RS2 has successfully received downlink dada and further forwarded the data, but failed to receive the feedback from subordinate node due to bad wireless channel. RS2 receives an MAP message indicating RS2 to receive the feedback in the fourth frame. However, in the fourth frame, RS2 may not receive the feedback and has acquired its success to receive downlink data, and therefore it shall send upwardly feedback code C2 in the fifth frame and retransmission begins from RS2.

In respect of uplink data HARQ, once receiving an uplink MAP message for allocating resources (indicating the RS to send a certain HARQ sub-burst in the $i^{th}$ frame), the RS shall read HARQ_ACKCH region allocation for Relay Data IE from that message and acquire the location where it sends uplink feedback of corresponding burst in that frame. In IEEE 802.16j system, it is possible to receive resource allocation message, send uplink data and give feedback in the same frame.

For example, RS shall receive the MAP message in the $i^{th}$ frame, read the channel where the feedback is sent from the corresponding IE, and send the feedback and HARQ data in the arranged channel in the $i^{th}$ frame.

Figure 9:
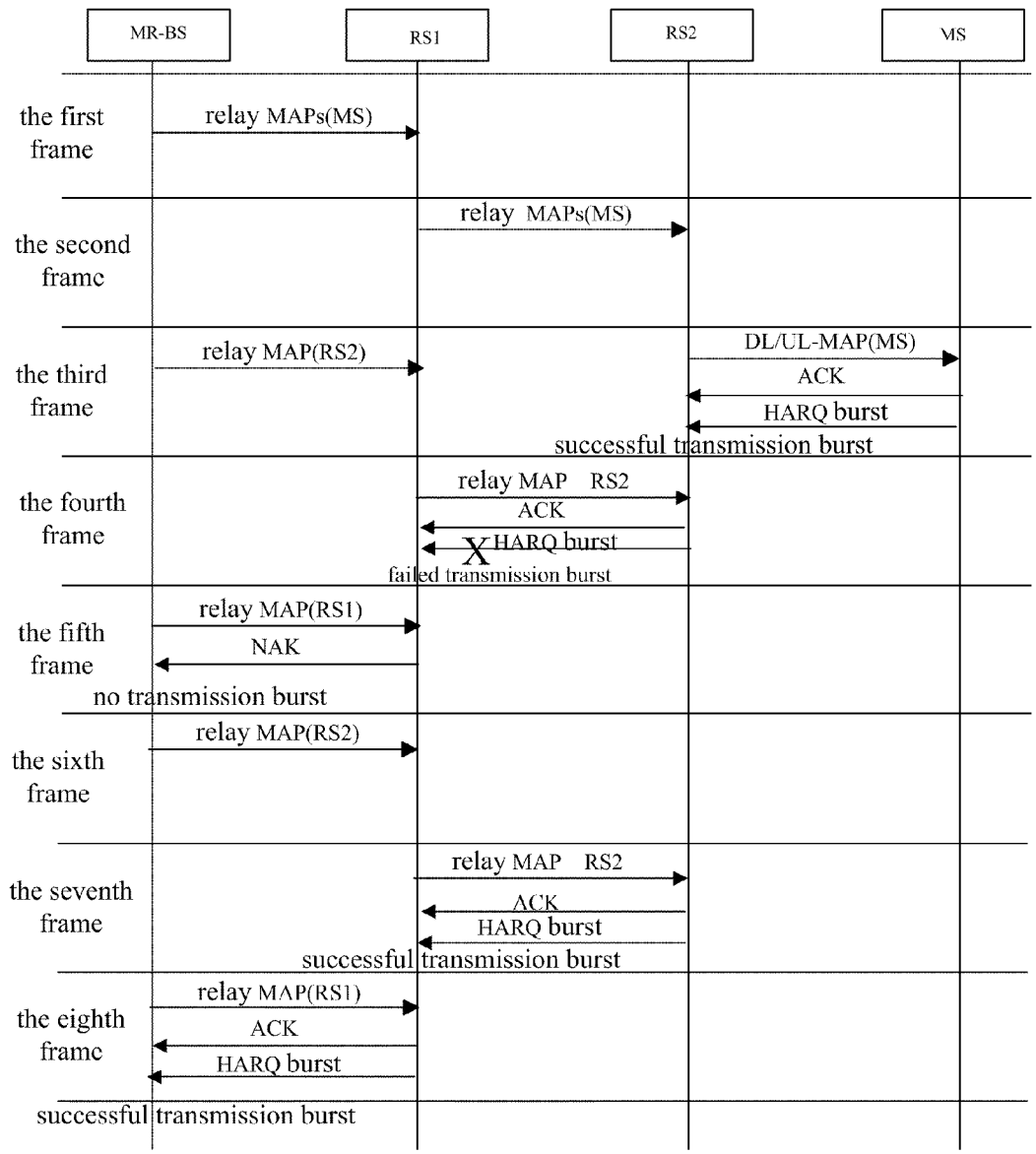
FIG. 9 is a schematic diagram showing the flow of uplink end-to-end HARQ comprising initial transmission and retransmission in IEEE802.16j system according to an embodiment of the present invention.

In FIG. 9 showing an example of uplink data initial transmission and burst retransmission, RS2 receives an MAP message indicating it to send uplink data received from MS in the fourth frame. In the fourth frame, in addition to sending uplink data, RS2 shall also be triggered to send upwardly ACK by means of resources specified by MR-BS. RS1 receives an MAP message in the fifth frame indicating it to send uplink data from RS2, but due to failing to decode the received uplink data, the RS1 shall not send any uplink data but only send upwardly NAK by means of resources specified by MR-BS in the fifth frame. In the HARQ data retransmission beginning in the seventh frame, RS2 receives an MAP message indicating it to send uplink data from MS. In addition to sending uplink data, RS2 shall also be triggered to send upwardly ACK by means of resources specified by MR-BS.

In the present invention, the activities of feedback and sending by the relay station have nothing to do with whether HARQ data is received or feedback is conducted, and therefore, a complete and uniform definition of processes triggering the relay station to conduct feedback or sending in several HARQ scenarios such as initial transmission and retransmission of downlink and uplink, and uplink feedback lost of subordinate node etc. has been achieved.

The present invention has been shown with reference to the above-described embodiments, and it is not to be limited by the above embodiments. It is understood by those skilled in the art various alterations and changes may be made. All modifications, substitute equivalents or improvements made within the spirit and principle of the invention are intended to be embraced in the scope of the claims of this invention.

The invention claimed is:

1. A method for relaying and forwarding feedback information in hybrid automatic repeat request scenario, the method comprising:
   receiving a resource allocation message with a relay station;
   utilizing the relay station to determine a time for sending feedback information according to the resource allocation message, and sending the corresponding feedback information at the determined time for sending the feedback information.

2. The method according to claim 1, further comprising use of the relay station for sending downlink data to a subordinate node, and for receiving a resource allocation message from a superordinate node indicating the relay station to receive feedback information of the subordinate node in an $i^{th}$ frame.

3. The method according to claim 2, wherein if the relay station has received the feedback information in the $i^{th}$ frame, then the relay station sends the feedback information upwardly to a multi-hop relay base station in an $(i+j)^{th}$ frame through an uplink feedback channel allocated by the multi-hop relay base station, or else the relay station sends information for notifying the multi-hop relay base station of a hop at which retransmission occurs in the $(i+j)^{th}$ frame through the uplink feedback channel, wherein j is a time delay resulting from processing the feedback information by the relay station.

4. The method according to claim 3, wherein if the feedback information is acknowledgement information, the relay station directly sends the feedback information upwardly to the multi-hop relay base station.

5. The method according to claim 3, wherein if the feedback information is negative acknowledgement information, the relay station processes the feedback information and sends the processed feedback information upwardly to the multi-hop relay base station so as to notify the multi-hop relay base station of the hop at which retransmission occurs.

6. The method according to claim 5, wherein if the relay station has not received the downlink data successfully, which results in the relay station failing to receive the feedback information in the $i^{th}$ frame, then the relay station notifies the multi-hop relay base station of retransmission between the relay station and the superordinate node.

7. The method according to claim 5, wherein if the relay station has received the downlink data successfully, but has failed to receive the feedback information in the $i^{th}$ frame due to a bad wireless channel, then the relay station notifies the multi-hop relay base station of retransmission between the relay station and the subordinate node.

8. The method according to claim 1, wherein the relay station, in the process of sending uplink data to the superordinate node, receives a resource allocation message from the superordinate node indicating the relay station to send the uplink data in the $i^{th}$ frame.

9. Then method according to claim 8, wherein if the relay station has received the uplink data correctly, then the relay station sends upwardly to the superordinate node in the $i^{th}$ frame (a) the information for notifying the superordinate node that the relay station has successfully received the uplink data and (b) the uplink data, respectively, through the uplink feedback channel and the transmission channel allocated by the multi-hop relay base station.

10. The method according to claim 8, wherein if the relay station has not received the uplink data successfully, then the relay station sends the information upwardly for notifying the multi-hop relay base station of the hop at which retransmission occurs through the uplink feedback channel in the $i^{th}$ frame.

* * * * *